UNITED STATES PATENT OFFICE.

STEPHEN D. CASTLEMAN, OF WASHINGTON, DISTRICT OF COLUMBIA.

BUILDING-BLOCK.

SPECIFICATION forming part of Letters Patent No. 358,837, dated March 8, 1887.

Application filed August 5, 1886. Serial No. 210,119. (No specimens.)

*To all whom it may concern:*

Be it known that I, STEPHEN D. CASTLEMAN, a citizen of the United States, residing at Washington, in the District of Columbia, have invented certain new and useful Improvements in Building-Blocks; and I do hereby declare the following to be a full, clear, and exact description of the invention, such as will enable others skilled in the art to which it appertains to make and use the same.

Heretofore great loss and injury have been occasioned because of the want of proper protection to cattle and other domestic animals in those sections of country where timber and other building material is scarce, and particularly in the Western States and Territories of the United States, growing out of the inability of the inhabitants of those sections to properly and safely protect and shelter such animals from the elements, owing to the scarcity of such building material. In tropical and semi-tropical countries, also, where shade is not abundant, much suffering is occasioned from the exposure of the inhabitants of those sections to the extreme heat of the sun. Conveniently contiguous to such portions of country are found the stalks of certain species of grain, pulse, and the like, chiefly of wheat, rye, oats, barley, buckwheat, corn, and peas, commonly denominated "straw," which when cut and thrashed have been in many instances regarded as worthless, except for fertilizing purposes. It is well known that large quantities of such straw in many parts of the United States and elsewhere are left uncut and unharvested because of its small commercial value. It is also well known that such straw is, to a large extent, and sufficiently so for the practical purposes hereinafter described, a non-conductor of heat.

The object, therefore, of my discovery and invention is to utilize the aforesaid comparatively waste material for the benefit of man and beast, by converting the same by suitable means into a durable and profitable building and sheltering material, with a view to its special use and adoption in the far western portions of the United States.

To carry my invention into effect, one of my methods is to suitably cut or macerate such straw, pulse, or other similar stalks by well-known means and to mingle the same with pulverized asbestus or other incombustible substances, which, when moistened and mixed, I place in a mold of the form desired, and by pressure render the same compact and shaped for the purposes described, and hereinbefore mentioned. I then expose this pulpy material to the rays of the sun, or to artificial heat, as may be convenient, until the same becomes dry and hard. It is then ready for use and may be easily transported to any desired point.

I render said building material, when manufactured as described, impervious to water and dampness by treating or coating the same with paint or other well-known water-proof compounds, thereby securing all of the advantages derived from the use of other and more expensive and often inaccessible building material.

I am aware that it is not new to make bricks by mixing straw with clay, and that shelters for man and beast have been made or formed by a proper arrangement of bales of hay or straw in its dry or cured state unmixed with fire or water proof or other material; but this I do not claim.

Having fully described my invention, what I desire to claim and secure by Letters Patent is—

1. As a new article of manufacture, a building-block composed of cut straw, pulse, or other similar material and asbestus or other incombustible fiber moistened and pressed into a compact mass, as and for the purposes set forth.

2. As a new article of manufacture, a building-block composed of cut straw, pulse, or other similar material and asbestus or other incombustible fiber moistened, pressed, and painted with any suitable water-proof compound, as described.

In testimony whereof I affix my signature in presence of two witnesses.

STEPHEN D. CASTLEMAN.

Witnesses:
WARREN C. STONE,
GEORGE H. PLANT.